UNITED STATES PATENT OFFICE.

HOMER T. YARYAN, OF TOLEDO, OHIO.

PROCESS FOR THE PURIFICATION OF ROSIN.

934,257.  Specification of Letters Patent.  Patented Sept. 14, 1909.

No Drawing.  Application filed May 10, 1909.  Serial No. 495,048.

*To all whom it may concern:*

Be it known that I, HOMER T. YARYAN, a citizen of the United States, residing at Toledo, in the county of Lucas and State of Ohio, have invented a certain new and useful Process for the Purification of Rosin; and I do declare the following to be a full, clear, and exact description of the invention, such as will enable others skilled in the art to which it appertains to use the same.

In some low grade rosins, and particularly those rosins extracted from stumps and fallen timber of resinous woods by the use of a solvent,—such as a hydrocarbon,—there is present a black pitchy rosin which lessens the value of the rosin for many purposes and lowers its commercial grade. This pitchy substance is insoluble in cold hydrocarbons. If the rosin be dissolved in a hot hydrocarbon and if the solution be then allowed to cool, the dark substance separates slowly and is precipitated and thus the objectionable constituent is removed. In establishments where rosin in large quantities is recovered from coniferous woods by means of a hot hydrocarbon solvent, it is found impracticable to cool the solvent by passing it through ordinary cooling apparatuses, for the reason that the precipitate clings so tenaciously to the walls of pipes or drums and accumulates so rapidly upon the exposed surfaces of the apparatus that it soon becomes clogged and inoperative. However, very large settling tanks may be employed, but in such case much time is consumed in the cooling of the liquid, and a great volume of solvent remains idle during the slow cooling operation.

The object of my invention is to obviate the objections and difficulties here indicated and to provide a process by means of which the dark objectionable pitchy substances above referred to may be rapidly separated and precipitated. To this end, the hot solution of rosin and hydrocarbon is passed into a suitable containing vessel and is then by agitation thoroughly mixed with a sufficient quantity of cold water until the entire body of liquid is cooled. Now the precipitable matter is almost instantly separated from the solution and the liquid in the vessel, when the agitation ceases, quickly forms itself into three strata,—according to their gravity,—the water at bottom, the purified solution at top, and the pitchy mass between the two. The solution is now drawn or decanted off for use or further treatment, the pitchy adhesive mass is mechanically lifted or forked out, and the water is permitted to flow to waste.

Having described my invention, what I claim and desire to secure by Letters Patent is,—

1. The process of purifying rosin in solution with a hydro-carbon, which consists in mixing and agitating the solution with cold water, for the purpose of precipitating the impurities; then by gravity causing a separation into strata of the water, the precipitate thus obtained and the solution, and then separating said strata.

2. The process of purifying rosin in solution with a hydro-carbon, which consists in mixing and agitating the solution with cold water, for the purpose of precipitating the impurities; then by gravity causing a separation into strata of the water, the precipitate thus obtained and the solution, and then separating the top stratum from said strata.

In testimony whereof I affix my signature in presence of two witnesses.

HOMER T. YARYAN.

Witnesses:
A. G. DUER,
LEONA KIBURTZ.